United States Patent
Terashima

(10) Patent No.: US 9,139,047 B2
(45) Date of Patent: Sep. 22, 2015

(54) PNEUMATIC TIRE

(75) Inventor: Masaki Terashima, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 902 days.

(21) Appl. No.: 13/338,790

(22) Filed: Dec. 28, 2011

(65) Prior Publication Data

US 2012/0168050 A1  Jul. 5, 2012

(30) Foreign Application Priority Data

Dec. 29, 2010  (JP) ................................ 2010-294491

(51) Int. Cl.
*B60C 11/04* (2006.01)
*B60C 11/00* (2006.01)
*B60C 11/03* (2006.01)

(52) U.S. Cl.
CPC ......... *B60C 11/0083* (2013.04); *B60C 11/0306* (2013.04); *B60C 11/042* (2013.04); *B60C 2011/0365* (2013.04); *B60C 2011/0369* (2013.04); *B60C 2011/0372* (2013.04); *B60C 2011/0374* (2013.04); *B60C 2011/0381* (2013.04)

(58) Field of Classification Search
CPC ............ B60C 11/0083; B60C 11/0306; B60C 11/0309; B60C 11/04; B60C 11/042; B60C 2011/0369; B60C 11/0381; B60C 11/0348
USPC ............. 152/209.27, 209.18, 209.22, 209.25, 152/209.14, 454, 209.1
See application file for complete search history.

(56) References Cited

U.S. PATENT DOCUMENTS

| | | | | |
|---|---|---|---|---|
| 5,042,546 A | * | 8/1991 | Forney et al. | 152/454 |
| 6,079,463 A | | 6/2000 | Minami et al. | |
| 2005/0000613 A1 | * | 1/2005 | Maruoka et al. | 152/209.1 |
| 2010/0084061 A1 | * | 4/2010 | Kiwaki | 152/209.18 |
| 2010/0326577 A1 | * | 12/2010 | Iwai | 152/209.24 |
| 2011/0120609 A1 | * | 5/2011 | Nakamura | 152/209.18 |

FOREIGN PATENT DOCUMENTS

| | | | |
|---|---|---|---|
| JP | 10-181309 A | 7/1998 | |
| JP | 10-287106 A | 10/1998 | |
| WO | WO 2009/034791 | * 1/2009 | .............. B60C 11/04 |
| WO | WO 2010/007924 | * 1/2010 | .............. B60C 11/04 |

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A tire contour shape is formed by a single arc in a condition in which tire flattening rate is more than 55% and less than 70% and internal pressure is 5%. Shoulder lateral grooves extend at an angle α of 80 to 90° from the axially outer side of the tread ground-contact edge to the axially inner side of the tire, and the tire axially inner ends terminate within the shoulder land portion. A tire axial distance Ds between the tire axially inner end and the shoulder circumferential main groove is in the range of 3.5 to 5.5 mm, the shoulder lateral groove has the deepest part where the groove depth is largest, and the groove depth of the deepest part is 70 to 90% of the groove depth of the shoulder circumferential main grooves.

12 Claims, 8 Drawing Sheets

PNEUMATIC TIRE

BACKGROUND OF THE INVENTION

1. Field of the Invention

The present invention relates to a pneumatic tire which has improved early wear performance in a shoulder portion, without deteriorating noise performance.

2. Description of the Background Art

In a pneumatic tire, in particular, a pneumatic tire for passenger cars, flattening of tire of 70% or less tends to proceed, for example, as vehicles have higher outputs and higher speeds in recent years. As shown in FIG. 8, conventionally, tread contour shape x1 of such a flattened tire, that is, the contour line x1 of an outer surface of a tread portion on a tire meridian cross section, is formed by connecting a plurality of arcs whose radii of curvature r differ such that the radius of curvature becomes smaller sequentially toward the axial outer side of the tire (See Japanese Patent Application Publication No. 10-181309, and Japanese Patent Application Publication No. 10-287106).

However, in a tire with such a tread contour shape x1, a tire radius Tr on the side of a tread ground-contact edge Te significantly decreases, thus increasing amount of slippage with a road surface. Hence, there is a problem that wear speed of the shoulder portion sh is relatively fast, and lateral grooves to be arranged on the shoulder portion are worn out early.

The possibility of increasing groove depth of the lateral grooves is also considered to delay abrasion of the lateral grooves. However, increased groove depth might not only degrade noise performance, but also increase an amount of deformation due to reduced block rigidity of the shoulder portion, thus further deteriorating wear resistance.

SUMMARY OF THE INVENTION

Hence, an object of the present invention is to provide a pneumatic tire which can improve early wear performance of a shoulder portion and prevent early abrasion of lateral grooves, without deteriorating noise performance, basically by forming tread contour shape by a single arc, and regulating angle with respect to a tire circumferential direction, groove depth, and an inner end position of lateral grooves to be provided on the shoulder portion.

In order to solve the problem described above, the invention according to claim 1 of the application is a pneumatic tire with a tire flattening rate of more than 55% and less than 70%, wherein on a meridian cross section of a tire which is mounted on a standard wheel rim, and in a condition with an internal pressure of 5%, which is 5%, of a standard internal pressure, applied, a contour line of a surface of a tread portion forms an arc having a single radius of curvature, the pneumatic tire has in the tread portion circumferential main grooves including shoulder circumferential main grooves which continuously extend in a tire circumferential direction and are arranged at the axial outermost side of the tire, and a plurality of shoulder lateral grooves which are provided on shoulder land portions arranged on the tire axial outer side of the shoulder circumferential main groove and which not only extend from the tire axial outer side of a tread ground-contact edge to a tire axial inner side but also have an inner end in a tire axial direction terminating within the shoulder land portions, furthermore, the shoulder lateral grooves have angle α with respect to the tire circumferential direction in a range of 80 to 90° and a tire axial distance Ds between the tire axially inner end and the shoulder circumferential main groove is in a range of 3.5 to 5.5 mm, and the shoulder lateral grooves have the deepest part where the groove depth is largest and the groove depth of the deepest part is made 70 to 90% of the groove depth of the shoulder circumferential main groove.

Now, the tire shape in the "condition with an internal pressure of 5%" usually matches tire shape of a vulcanized die, and the tire shape in the condition with an internal pressure of 5% can be controlled by specifying shape of the vulcanized die. In addition, in the specification, unless otherwise stated, dimensions and the like of each part of a tire shall be values that can be specified in the condition with an internal pressure of 5%.

The standard wheel rim is a wheel rim officially approved for the tire by standard organization, i.e. JATMA (Japan and Asia), T&RA (North America), ETRTO (Europe), STRO (Scandinavia) and the like. The standard rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at various Cold Inflation Pressures" table in TRA or the like. In case of passenger car tires, however, the standard pressure is uniformly defined by 180 kPa.

The tread edges are the axial outermost edges of the ground contacting patch in a condition that the tire is mounted on a standard wheel rim and inflate to a standard pressure and loaded with a standard load.

The standard load is a tire load specified by the standard organization above. For example, the standard load is the "maximum load capacity" in JATMA, the "Load Capacity" in ETRTO, the maximum value given in the above-mentioned table in TRA or the like.

As described above, the present invention forms a contour line of a surface of a tread portion by an arc having a single radius of curvature. Therefore, a percentage of changes in a tire radius of the shoulder land portions can be kept low, and a difference in the amount of slippage of a tread surface and a road surface relative to a difference in positions in the tire axial di reaction can be made relatively small.

In addition, with the shoulder lateral grooves closer to the tire axial direction with its angle α with respect to the tire circumferential direction set to 80 to 90°, a corner portion sandwiched by the shoulder lateral groove and the shoulder circumferential main groove, for example, can be prevented from being shaped like a point of a knife and a starting point of wear. Furthermore, as the inner end of the shoulder lateral groove in the tire axial direction is spaced from the shoulder circumferential main groove, rigidity of the entire shoulder land portion as well as the corner portion can be increased. Thus, even if the groove depth of the deepest part of the shoulder lateral groove is set deeper than usual, such as 70 to 90% of the groove depth of the shoulder circumferential main groove, reduction in rigidity can be kept low. Coupled with the effect of reducing the amount of slippage by forming the tread contour shape with a single arc, the shoulder lateral grooves can be deepened while improving early wear performance. Thus, early abrasion of the shoulder lateral grooves can be controlled.

In addition, degradation of noise performance due to deepening of the shoulder lateral grooves can be controlled by having the inner end of the shoulder lateral groove spaced from the shoulder circumferential main groove.

DESCRIPTION OF THE PREFERRED EMBODIMENTS

Figure 1:
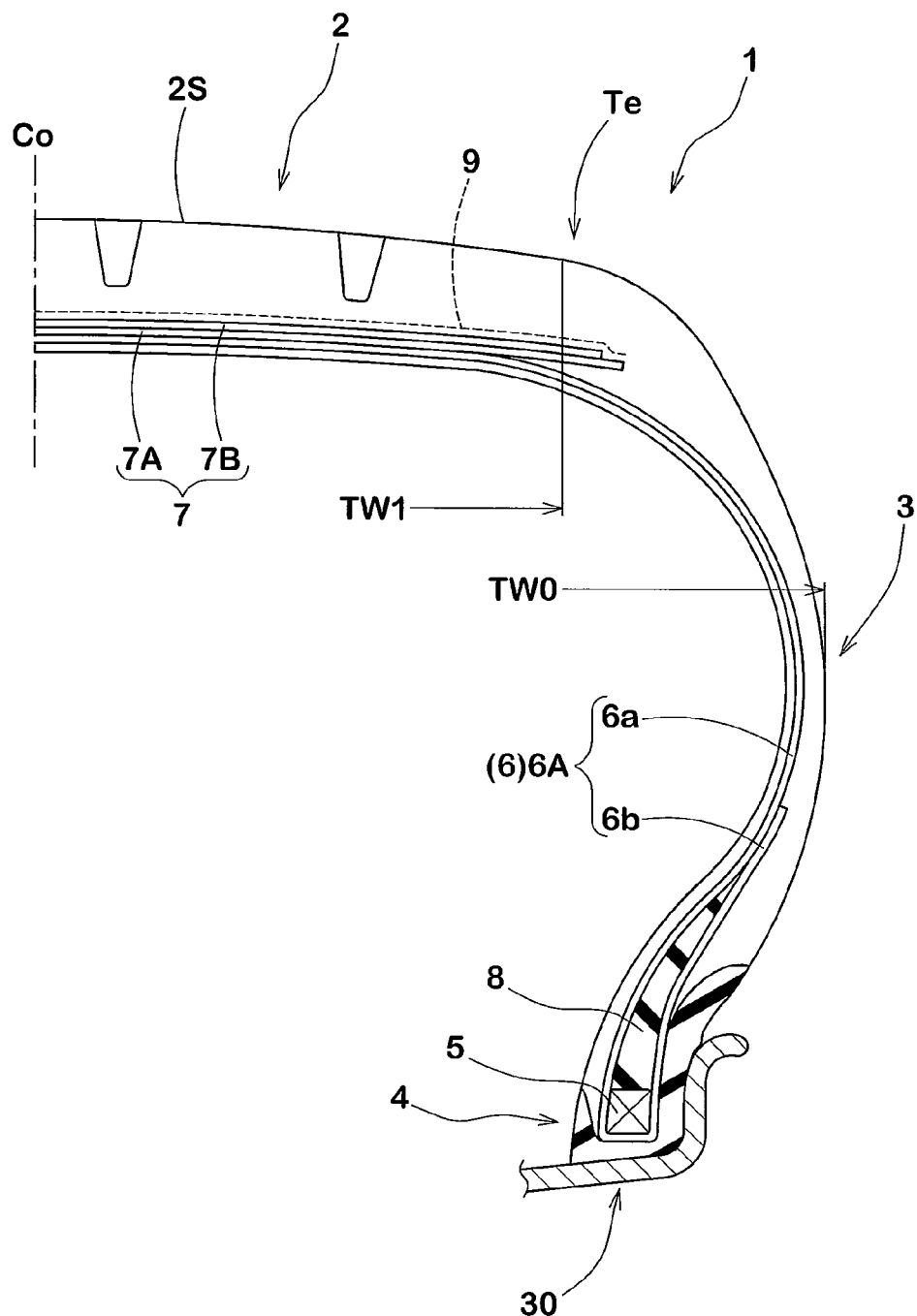
FIG. 1 is a cross sectional view showing one embodiment of a pneumatic tire of the present invention.

Embodiments of the present invention will be described in detail hereinafter. FIG. 1 shows a tire meridian cross section in which a pneumatic tire 1 of the present invention is mounted on a standard rim 30 and in a condition with an internal pressure of 5%, which is 5% of a standard internal pressure, applied. In FIG. 1, the pneumatic tire 1 includes a carcass 6 which extends from a tread portion 2 to bead portions 4 each with a bead core 5 therein via sidewall portions 3, and a belt 7 disposed inside the tread portion 2 and on the radially outside the carcass 6.

A carcass and a belt 7 having a similar structure to a conventional tire can be preferably used for the carcass 6 and the belt 7. The embodiment exemplifies a case of the carcass 6 formed of one carcass ply 6A of carcass cords arranged at an angle in the range of 75 to 90° with respect to a circumferential direction of the tire. The carcass ply 6A has a series of a toroid-shaped ply main portion 6a spanning the bead cores 5, 5, and turnup portions 6b to be turned up from the axially inside to the axially outside of the tire around the bead cores 5, at both ends of the ply main portion 6a. Between the ply main portion 6a and the ply turnup portion 6b is disposed a bead apex rubber 8 for bead reinforcement which tapers from the bead core 5 radially outwardly.

This embodiment shows a case of the belt 7 formed of two belt plies 7A, 7B, having belt cords arranged at an angle of 10 to 35°, for example, with respect to the circumferential direction of the tire. As belt cords of respective plies intersecting each other enhance belt rigidity, almost full width of the tread portion 2 has hooping effect and is reinforced strongly. On the radially outward of the belt 7, a band layer 9 of a well-known structure which is a band cord spirally wound in the circumferential direction can be provided to improve high speed durability.

Figure 2:
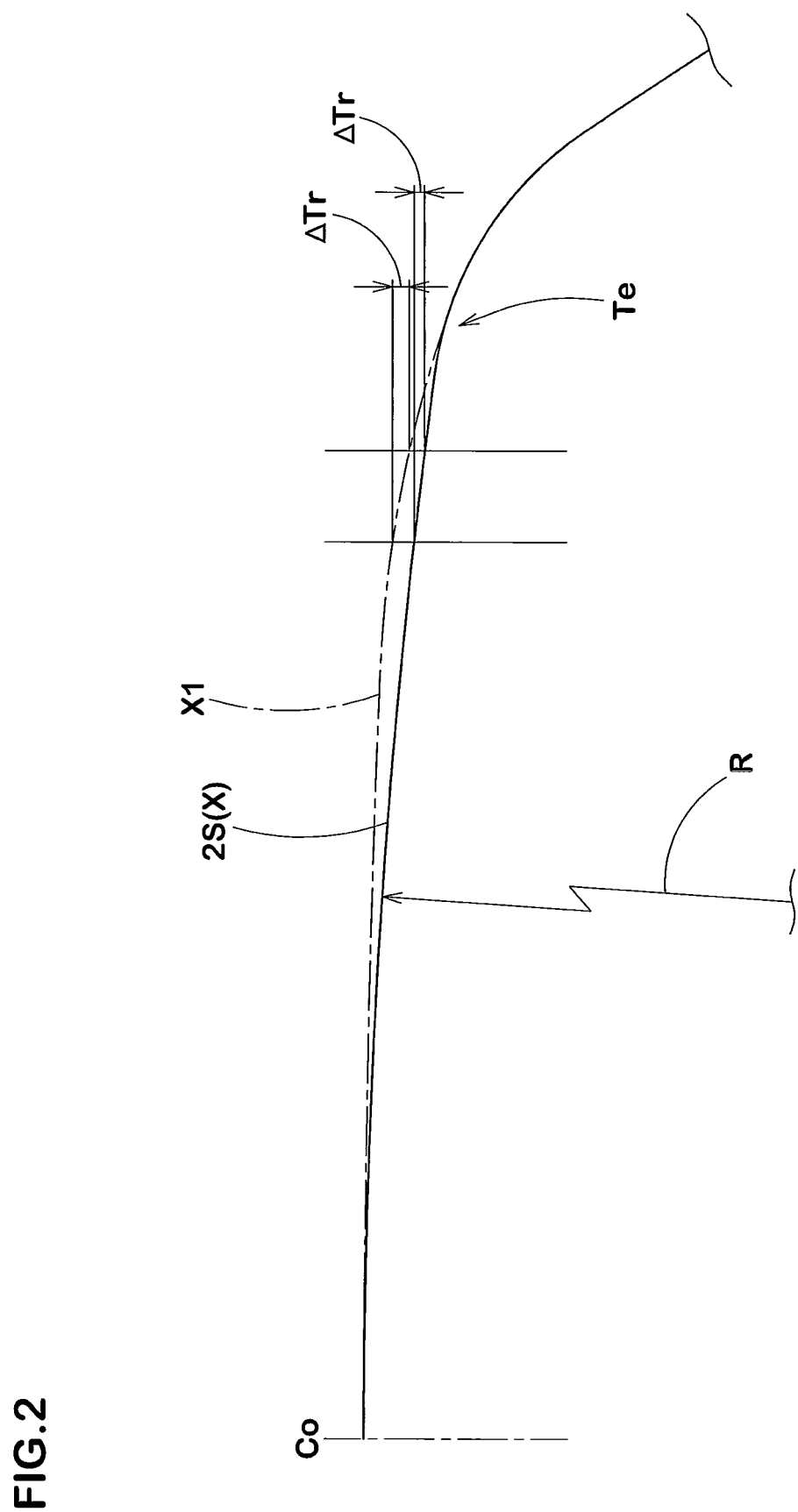
FIG. 2 is a diagrammatic view of a tread contour shape.

The pneumatic tire 1 is a flat tire whose tire flattening rate is 55% or more and 70% or less. Furthermore, as shown in FIG. 2, on a meridian cross section of the tire in the condition with the internal pressure of 5% applied, a contour line x of a surface 2S (which may be referred to as a tread surface 2S) of the tread portion 2 is formed by an arc having a single radius of curvature R. In this manner, by making the tread contour shape x of a flat tire having the flattening rate in the range a single arc, a proportion of change ΔTr of the tire radius on the side of tire ground-contact edge can be kept lower than tread contour shape x1 (shown by the dashed line) of a conventional flat tire. Consequently, a difference in an amount of slippage of the tread surface and a road surface relative to a difference in positions in the tire axial direction can be made relatively small. In addition, in this embodiment, a ratio Tw1/Tw0 of contact width Tw1, which is axial width of the tire between the tread ground-contact edges Te, Te, to tire sectional width TW0 is in the range of 0.73 to 0.79. Conventionally, tread contour shape of a flat tire whose tire flattening rate and the ratio Tw1/Tw0 are in the ranges is formed of a composite arc of a plurality of connected arcs. In addition, the radius of curvature R is preferably in the range of 3.0 to 4.5 times of the ground-contact width Tw1.

Figure 3:
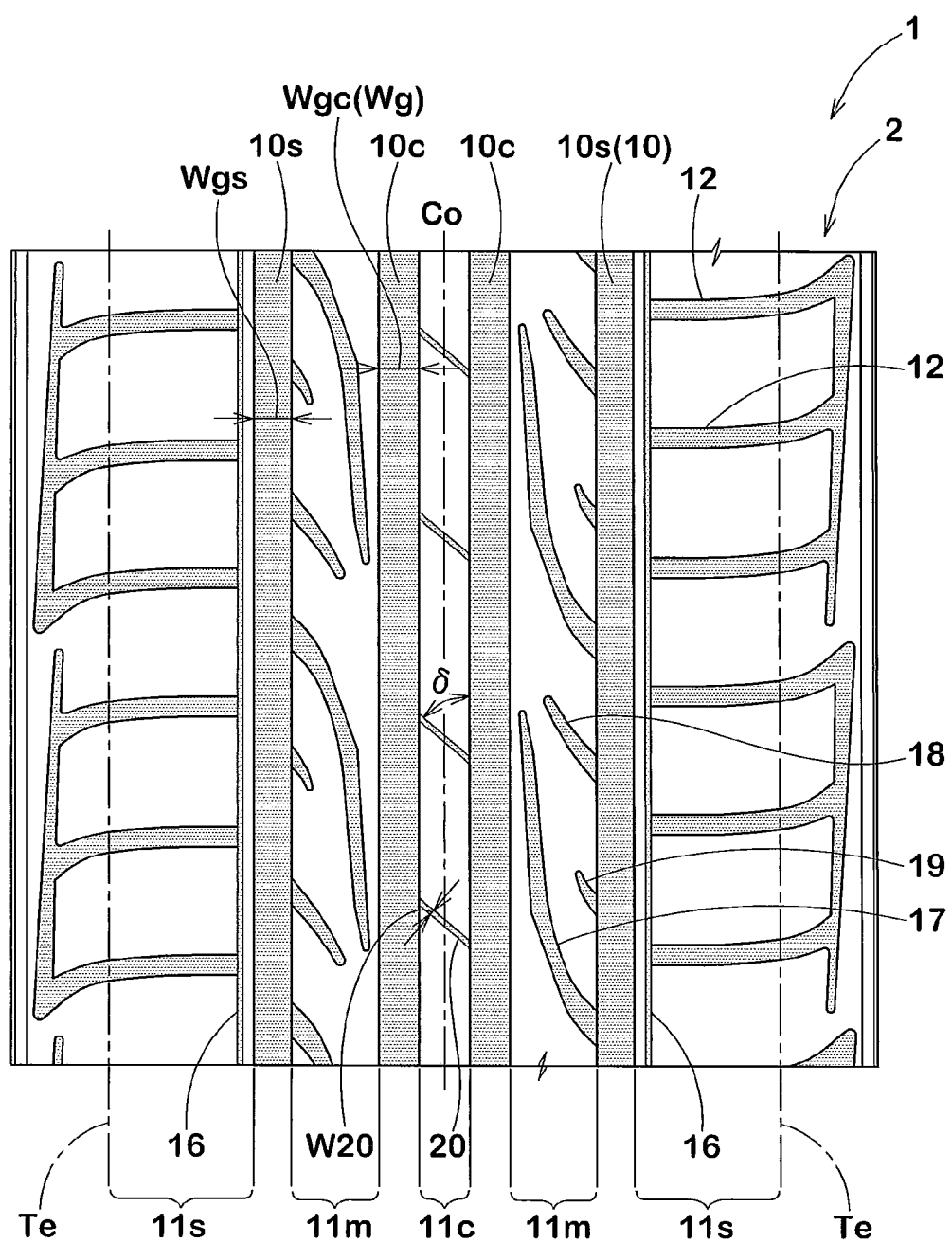
FIG. 3 is a development view showing a tread pattern of the pneumatic tire on a plan.

Next, as shown in FIG. 3, the tread portion 2 includes circumferential main grooves 10 including shoulder circumferential main grooves 10s continuously extending in the tire circumferential direction and arranged at the axially outermost side of the tire, and a plurality of shoulder lateral grooves 12 provided on shoulder land portions 11s which are arranged on the tire axial outer side of the shoulder circumferential main grooves 10s.

Specifically, in this embodiment, the circumferential main grooves 10 are formed by four grooves of the shoulder circumferential main grooves 10s and crown circumferential main grooves 10c arranged inside thereof and on both sides of a tire equator Co. with this, the tread portion 2 is divided into a crown land portion 11c between the crown circumferential main grooves 10c, middle land portions 11m between the crown circumferential main grooves 10c and the shoulder circumferential main grooves 10s, and the shoulder land portions 11s.

The crown circumferential main grooves 10c and the shoulder circumferential main grooves 10s are straight grooves linearly extending in the circumferential direction of the tire, and arranged at line-symmetric positions with the tire equator Co as a center. Groove width and groove depth of a conventional circumferential main groove can be preferably adopted as the grove width Wg and the groove depth Hg (shown in FIG. 6B) of the crown circumferential main grooves 10c and the shoulder circumferential main grooves 10s. For example, in the case of a tire for passenger cars, the groove width Wg preferably has a lower limit of 3 mm or more and more preferably 5 mm or more, and an upper limit of 14 mm or less and more preferably 12 mm or less. In addition, the groove depth Hg preferably has a lower limit of 5 mm or more and more preferably 6 mm or more, and an upper limit of 12 mm or less and more preferably 10 mm or less. In this embodiment, the groove width Wgc and the groove depth Hgc of the crown circumferential main grooves 10c are 10.5 mm and 8.2 mm, respectively, and the groove width Wgs and the groove depth Hgs of the shoulder circumferential main grooves 10s are 8.2 mm and 8.2 mm, respectively.

Figure 4:
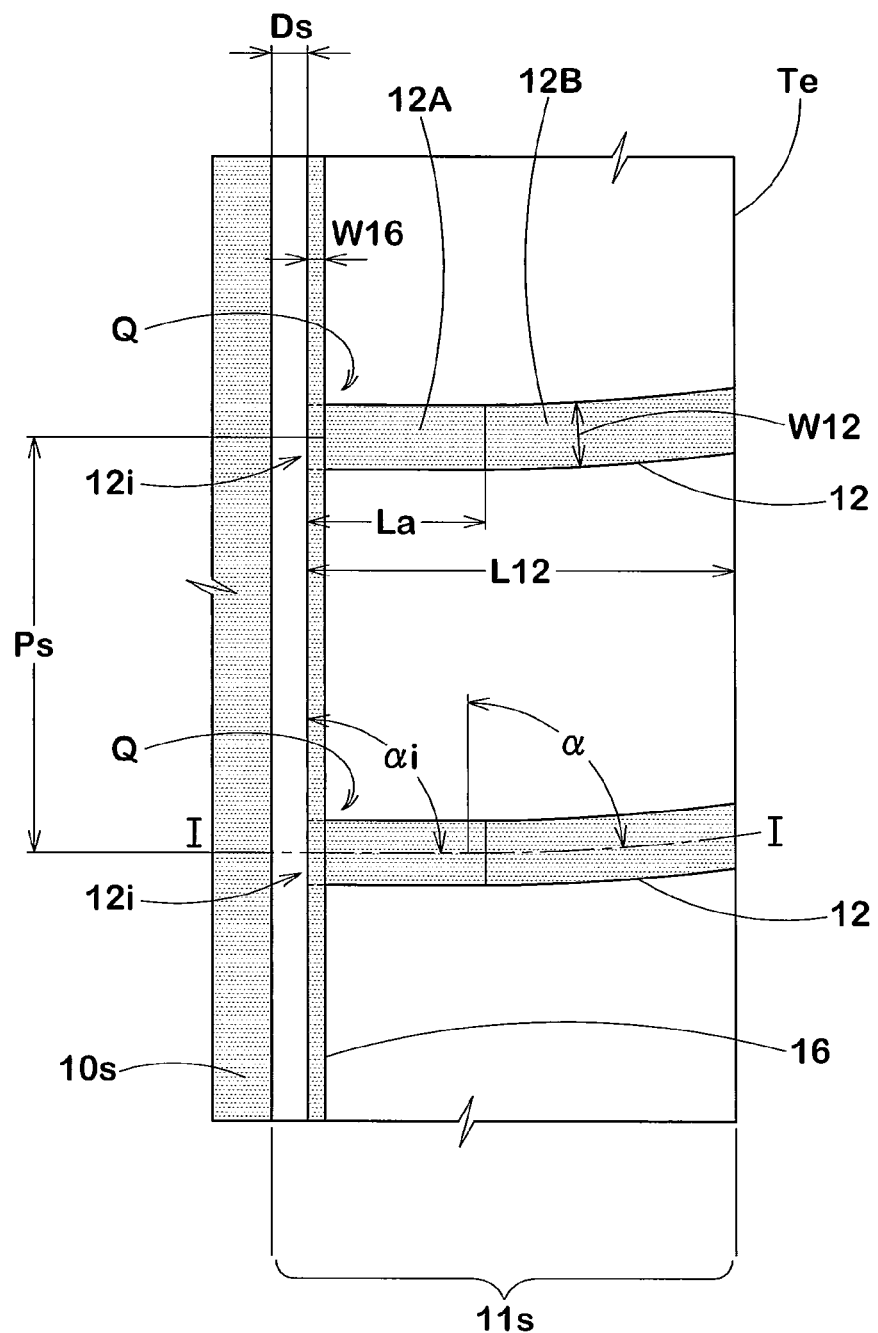
FIG. 4 is a development view showing an enlarged shoulder portion.

In addition, a plurality of shoulder lateral grooves 12 spaced in the tire circumferential direction is provided in the shoulder land portions 11s. As shown in FIG. 4, not only the shoulder lateral grooves 12 extend from positions on the axially outer side than the tread ground-contact edge Te to the tire axially inner side, but also their tire axially inner ends 12i terminate within the shoulder land portion 11s. Angle α of the shoulder lateral groove with respect to the tire circumferential direction on the smaller side is in the range of 80 to 90°. In addition, a tire axial distance Ds between the tire axially inner ends 12i and the shoulder circumferential main grooves 10s is in the range of 3.5 to 5.5 mm. In particular, in the embodiment, angle αi of the shoulder lateral grooves 12 at the tire axially inner ends 12i with respect to the tire circumferential direction is 84 to 90°.

Thus, as the angle α is regulated and the shoulder lateral grooves 12 are made closer to the tire axial direction, a corner portion Q sandwiched by the shoulder lateral groove 12 and the shoulder circumferential main groove 10s is prevented from being a point of a knife, and thus a starting point of wear. Furthermore, as the tire axially inner ends 12i of the shoulder lateral grooves 12 are spaced from the shoulder circumferential main grooves 10s, high rigidity of the entire shoulder land portion 11s as well as the corner portion Q can be ensured.

Therefore, as described below, even if groove depth H12a of the deepest part 15 of the shoulder lateral groove 12 is made deeper than conventional groove depth, reduction of rigidity can be kept low. Consequently, coupled with the effect of reducing the amount of slippage because of formation of the tread contour shape with a single arc, the shoulder lateral grooves 12 can be deepened while improving the early abrasion performance. Thus, early abrasion of the shoulder lateral grooves 12 can be controlled.

Figure 6A:
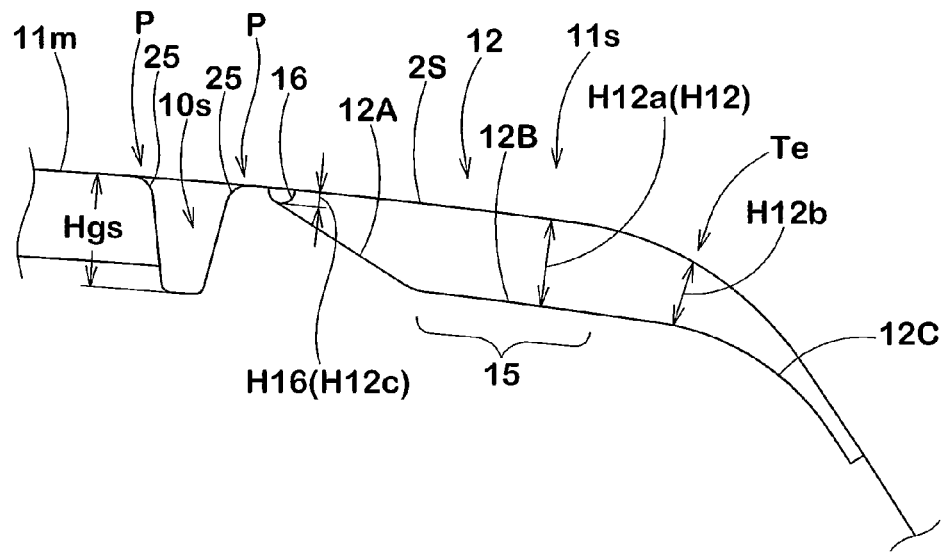
FIG. 6A is a cross sectional view taken along the line I-I running at the center of groove width of the shoulder lateral groove.
Figure 6B:
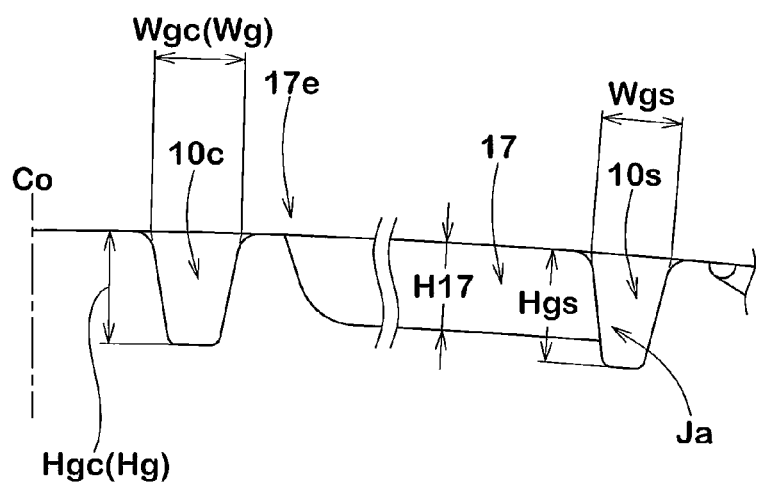
FIG. 6B is a cross sectional view taken along the line II-II running at the center of groove width of a middle inclined groove.

Specifically, as shown in a cross section taken along the line I-I along the center of groove width of the shoulder lateral groove 12 of FIG. 6A, the shoulder lateral groove 12 has the deepest part 15 where the groove depth H12 is largest, and the groove depth H12a of the deepest part 15 is set to 70 to 90% of the groove depth Hgs of the shoulder circumferential main grooves 10s, which is deeper than the conventional groove width.

To be specific, the shoulder lateral groove 12 has a first inclined portion 12A whose groove depth H12 gradually increases from the tire axially inner end 12i axially outwardly, and a fixed-depth portion 12B connecting to the first inclined portion 12A. To the fixed-depth portion 12B is connecting a second inclined portion 12c whose groove depth tapers to the axially outward. The first inclined portion 12A tilts linearly, and tire axial length La (shown in FIG. 4) of the first inclined portion 12A is 25 to 50% of tire axial length L12 which is from the tire axially inner end 12i of the shoulder lateral groove 12 to the tread ground-contact edge Te. In addition, the shoulder lateral groove 12 not only forms the deepest portion 15 in the fixed-depth portion 12B, but also has groove depth H12b at the tread ground-contact edge Te of 4.0 to 5.0 mm.

Thus, the first inclined portion 12A can smoothen any rigidity change as exemplified by the groove depth H12 gradually changing over a wide range. Therefore, generation of uneven wear starting around the tire axially inner end 12i can be prevented, while ensuring large groove depth H12a at the deepest portion 15 and controlling early abrasion of the shoulder lateral transverse grooves 12. In addition, with the fixed-depth portion 12B, the deepest portion 15 can be formed in a wide range and thus high drainage performance can be achieved.

In addition, deepening the shoulder lateral transverse grooves 12 degrades noise performance. However, in the embodiment, the inner ends 12i of the shoulder lateral transverse grooves 12 are spaced from the shoulder circumferential main grooves 10s. Thus, compressed air from the shoulder lateral grooves 12 flows to the shoulder circumferential main grooves 10s, and any noise such as air-column resonance and the like can be controlled. In addition, as the shoulder lateral grooves 12 open on the outer side of the tread ground-contact edge Te, degradation of pumping sound can be prevented in the shoulder lateral grooves 12.

Now, when the angle α of the shoulder lateral grooves 12 falls below 80°, in particular, when the angle αi at the inner end 12i falls below 84°, the corner portion Q is like a point of knife and degrades the rigidity, thus deteriorating early wear performance, as exemplified by uneven wear with the corner portion Q as a starting point, and the like. The rigidity of the corner portion Q also becomes poor when the distance Ds falls below 3.5 mm, thus deteriorating the early wear performance. In contrast, when the distance Ds exceeds 5.5 mm, the drainage performance becomes poor. In addition, if the groove depth H12a of the deepest part 15 is less than 70% Of the groove depth Hgs of the shoulder circumferential main grooves 10s, control of early abrasion is difficult because the groove depth H12a itself is small, although early wear is controlled. In contrast, it exceeds 90%, the groove is too deep and deteriorates the rigidity of the shoulder land portions 11s, thus degrading the early wear performance. In addition, if the tire axial length La of the first inclined portion 12A is less than 25% of the length L12 of the shoulder lateral grooves 12, the groove depth H12 rapidly changes. Specifically, the rigidity greatly changes, leading to uneven wear with the area around the inner end 12i of the shoulder lateral groove 12 as a starting point. In contrast, if it exceeds 50%, it is disadvantageous to the drainage performance and early abrasion of the shoulder lateral grooves 12. Similarly, if the groove depth H12b of the shoulder lateral grooves 12 at the tread ground-contact edge Te is less than 4.0 mm, it is disadvantage to the drainage performance and early abrasion. In contrast, if it exceeds 5 mm, it leads to reduced rigidity of the shoulder land portion 11s.

In addition, in the embodiment, the shoulder land portions 11s includes shoulder thin grooves 16 extending in the tire circumferential direction through the inner ends 12i of the shoulder lateral grooves 12. Groove width W16 of the shoulder thin grooves 16 is sufficiently smaller than the groove width Wgs of the shoulder circumferential main grooves 10s. In the embodiment, the groove width W16 is formed to be 3 mm or less, and preferably 2 mm or less. In addition, the groove depth H16 of the shoulder thin grooves 16 is sufficiently smaller than the groove depth Hgs of the shoulder circumferential main grooves 10s. In the embodiment, the groove depth H16 is formed to be 3 mm or less and preferably 2 mm or less. In the embodiment, the groove depth H16 of the shoulder thin grooves 16 is made identical to the groove depth H12c at the inner ends 12i of the shoulder lateral grooves 12.

In addition, the shoulder land portions 11s includes an arcuate chamfered section 25 at a corner portion P where the tread surface 2S and a groove wall surface of the shoulder circumferential main grooves 10s meet. A similar chamfered section 25 is also formed at a corner P where the groove wall surface of the shoulder circumferential main grooves 10s and the tread surface 2S of the middle land portions 11m meet. A radius of curvature of the chamfered section 25 is about 1.5 to 3.0 mm, and controls uneven wear with the corner portion P as a starting point.

Figure 5:
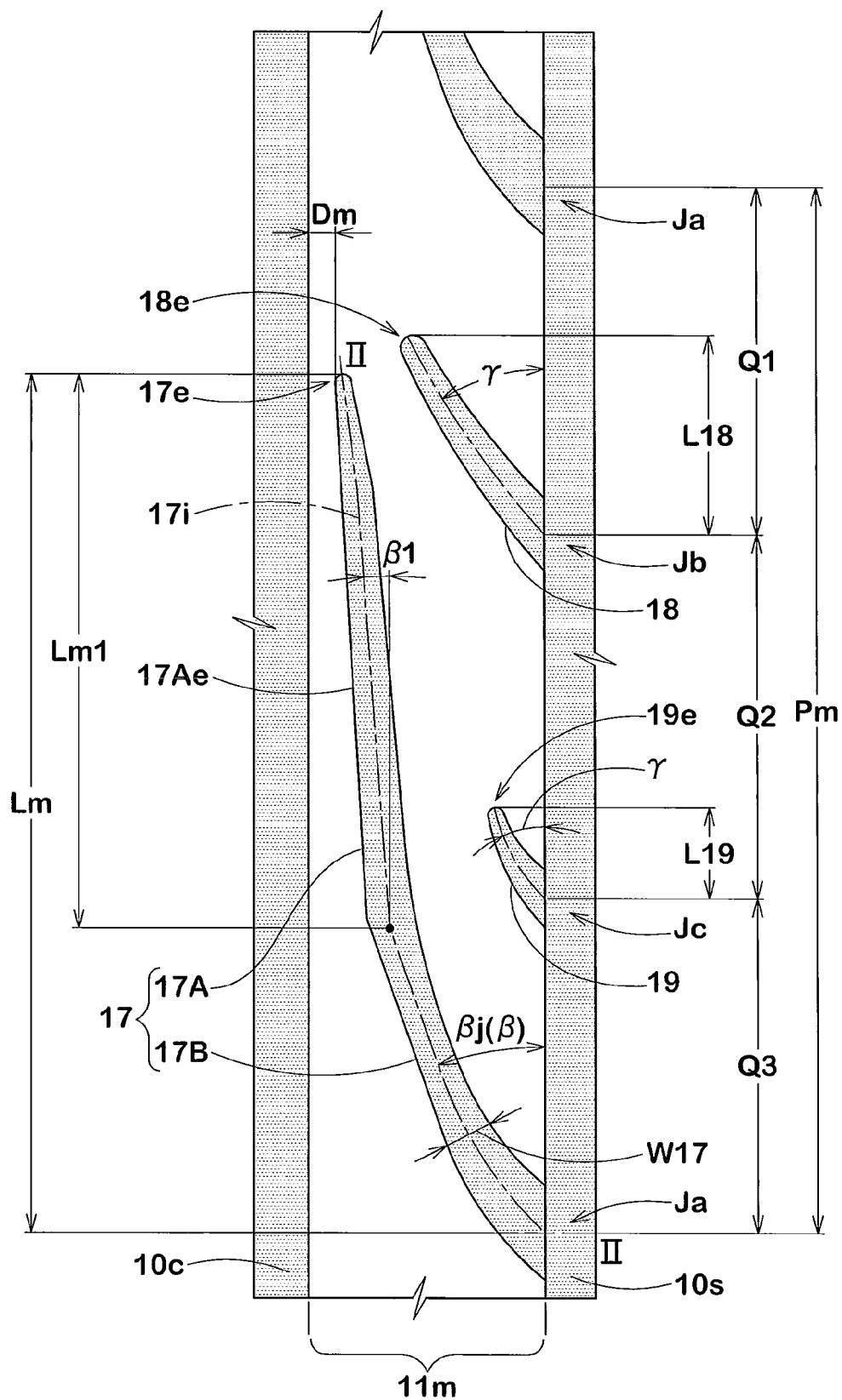
FIG. 5 is a development view showing an enlarged middle land portion.

In the embodiment, a plurality of middle inclined grooves 17 are formed on the middle land portion 11m. As shown in FIG. 5, the middle inclined groove 17 steeply extends at small angle β of 0 to 45° with respect to the circumferential direction from the shoulder circumferential main groove 10s to the axially inward. Its inner end 17e in the tire axial direaction also terminates within the middle land portion 11m. An axial distance Dm between the inner end 17e in the tire axial direction and the crown circumferential main groove 10c is preferably in the range of 1.5 to 3.5 mm, and, in the embodiment, set smaller than the distance Ds. In addition, in the embodiment, circumferential length Lm of the middle inclined groove 17 is set to be 72 to 84% of a circumferential pitch Pm of the middle inclined groove 17. The circumferential pitch Pm is also set to the range of 2.5 to 3.5 times of the circumferential pitch Ps of the shoulder lateral groove 10s.

Now, the middle inclined groove 17 includes a linear groove section 17A which linearly extends axially inward at an angle β1 of 20° or less with respect to the tire circumferential direction. In addition, the "linearly extends" includes having one bend where two straight lines bend at angles of 170 to 180°, in addition to a groove width centerline 17i of the middle inclined groove 17 which forms a straight line.

To be specific, the middle inclined groove 17 of the embodiment is formed by the linear groove portion 17A extending from the inner end 17e in the tire axial direction, and a connecting groove portion 17B extending from the linear groove portion 17A to the shoulder circumferential main groove 10s while arcuately bending and/or polygonally curving, such that the angle β sequentially increases axially outwardly. For the linear groove portion 17A, in the embodiment, the groove inner edge of the tire axial direction 17Ae forms a straight line. In addition, circumferential length Lm1 of the linear groove portion 17A is set to 40 to 70% of circumferential length Lm of the middle inclined groove 17.

Thus, the middle inclined grooves 17 has the circumferential length Lm and can improve the drainage performance, such as reducing drainage resistance, by tilting sharply. In addition, as the inner ends 17e in the tire axial direction of the middle inclined grooves 17 terminate spaced by the distance Dm from the crown circumferential main groove 10c, high circumferential rigidity of the middle land portion 11m can be ensured. Consequently, uneven wear performance and steering stability can be improved while the drainage performance is achieved. In particular, the drainage performance can be further enhanced by forming the linear groove portions 17A in the middle inclined groove 17. Furthermore, the linear groove portions 17A smoothly reduce a distance with the crown circumferential main grooves 10c. Thus, any formation of a large rigidity change point which can be a starting point of uneven wear can be controlled. In particular, making the groove inner edge 17Ae a straight line further prevents formation of the rigidity change points, which is advantageous to uneven wear resistance. In addition, when the angle β exceeds 45°, the drainage performance cannot be sufficiently ensured. In addition, when the angle β1 of the linear groove portion 17A exceeds 20°, and its circumferential length Lm1 falls below 40% of the circumferential length Lm of the middle inclined grooves 17, the effect of improving the drainage performance by the linear groove portions 17A and that of improving uneven wear resistance by controlling generation of a starting point of uneven wear can no longer be achieved sufficiently. In addition, when the distance Dm is less than 1.5 mm, rigidity of the middle land portion 11m is reduced, leading to degradation of the uneven wear resistance and steering stability. In contrast, when it exceeds 3.5 mm, the drainage performance becomes poor.

In addition, for the connecting groove portion 17B, of the angles β, angle βj at an intersection portion Ja with the shoulder circumferential main groove 10s is 35 to 45°. This controls reduction of the drainage performance and lateral rigidity of the intersection portion Ja. In addition, if the angle βj is out of the range, the drainage performance at the intersection portion Ja is reduced, leading to reduction in the lateral rigidity.

In addition, the middle inclined groove 17 has the groove width W17 smaller than the groove width Wgs. In addition, as shown in a cross section taken along the line II-II along the center of groove width of the middle inclined groove 17 of FIG. 6B, the groove depth H17 (depth of the deepest part) of the middle inclined groove 17 is the groove depth Hgs or less.

For the drainage performance, in the middle land portion 11m are arranged first and second middle sub-grooves 18, 19 running between the middle inclined grooves 17, 17, which are adjacent in the tire circumferential direction, and extending from the shoulder circumferential main groove 10s axially inwardly. The first and second middle sub-grooves 18, 19 tilt at angle γ of 45° or less, similar to the middle inclined groove 17. Both of their inner ends 18e, 19e in the tire axial direction terminate within the middle land portion 11m. The first and second middle sub-grooves 18, 19 have circumferential length L18, L19 being 30% or less of the circumferential length Lm of the middle inclined groove 17, respectively. In the embodiment, the angle γ arcuately curves as it decreases axially inwardly. In addition, when the length L18, L19 exceed 30% of the circumferential length Lm, the rigidity of the middle land portion 11m is excessively reduced, adversely affecting steering stability.

When a meeting portion of the shoulder circumferential main groove 10s and the middle inclined groove 17 is Ja, a meeting portion of the shoulder circumferential main groove 10s and the first middle sub-groove 18 is Jb, and a meeting portion of the shoulder circumferential main groove 10s and the second middle sub-groove 19 is Jc, a circumferential distance Q1 between the circumferentially adjacent meeting portions Ja, Jb, a circumferential distance Q2 between the meeting portions Jb, Jc, and a circumferential distance Q3 between the meeting portions Jc, Ja are each in the range of 30 to 35% of the circumferential pitch Pm of the middle inclined groove 17, and the first and second middle sub-grooves 18, 19 are arranged between the middle inclined grooves 17, 17, at almost equal circumferential intervals.

In the embodiment, a plurality of crown lateral grooves 20 traversing the crown land portion 11c and being spaced in the tire circumferential direction are provided in the crown land portion 11c. In the embodiment, the crown lateral groove 20 is a thin groove whose groove width W20 is 0.5 to 1.0 mm, and extends at an angle δ with respect to the tire circumferential direaction. In the embodiment, the angle δ is set to be smaller than a maximum value of the angle α, and larger than a minimum value of the angle β.

Figure 7:
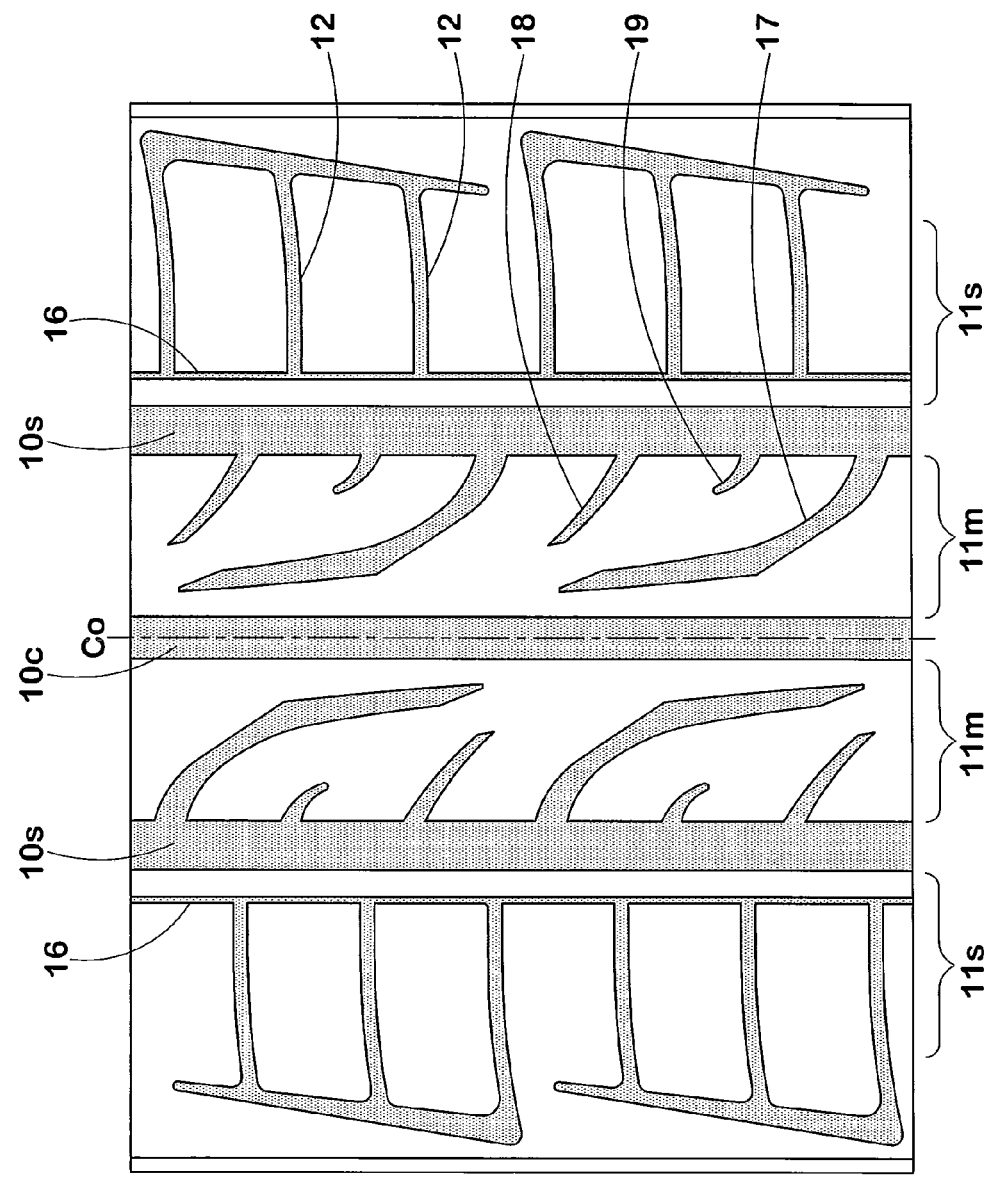
FIG. 7 is a development view showing other embodiment of a tread pattern.

FIG. 7 shows other embodiment of a tread pattern in a pneumatic tire 1. The embodiment shows a case in which the circumferential main groove 10 may be formed by three grooves of the shoulder circumferential main grooves 10s and the crown circumferential main groove 10c arranged therein and on the tire equator Co. Thus, a tread portion 2 in the embodiment is divided into four land portions of middle land portions 11m between a crown circumferential main groove 10c and shoulder circumferential main grooves 10s, and the shoulder land portions 11s, and the crown land portion 11c has been removed. However, other than this, the embodiment is formed substantially with the same configuration.

So far particularly preferred embodiments of the present invention have been described in detail. However, the present invention is not limited to the embodiments as shown, and may be modified to various aspects and performed.

EXAMPLES

Radial tires of size 195/65R15 for passenger cars were prototyped with the tread pattern shown in FIG. 1 as a standard pattern based on the specifications in Table 1, and noise performance and early wear performance of respective sample tires were tested. Each tire has substantially same specifications, except for anything listed in Table 1. Shown below are common specifications.

Crown Circumferential Main Grooves
Groove width Wgc—10.5 mm
Groove depth Hgc—8.2 mm
Shoulder Circumferential Main Grooves
Groove width Wgs—8.2 mm
Groove depth Hgs—8.2 mm
Shoulder Lateral Grooves
Groove width W12—3.0 mm
Groove depth (maximum value)—Table 1
Middle Inclined Grooves
Groove width W17—4.5 mm
Groove depth (maximum value) H17—6.7 mm
Crown Lateral Grooves
Groove width W20—0.8 mm
Groove depth (maximum value) H20—4.0 mm <Noise Performance>

The sample tires were mounted on all wheels of the vehicle (displacement of 2000 cc) under the conditions that the rim is (15×67) and the internal pressure (200 kPa). Then, noise level of pattern noise which occurs when the vehicle passes on a dry surface of paved road was measured. Evaluation results are indicated by an index with comparison example 100, by using an inverse number of a measured value. The larger the index value is, the less the pattern noise is and the better it is.

<Early Wear Performance> using the vehicle described above, the remaining groove amount of the shoulder lateral groove was measured after the vehicle ran for 8,000 km in MIX road wear mode (express highway 50%, general road 35%, mountain road 15%), and evaluation was made by the index with the comparison example 1 as 100. The measurement was performed at a position 10 mm inwardly spaced to the tire axial direction from the tread ground-contact edge.

TABLE 1-2

| | Example 8 | Example 9 | Example 10 | Example 11 |
|---|---|---|---|---|
| <Tread Contour Shape> | single arc (FIG. 2) | single arc (FIG. 2) | single arc (FIG. 2) | single arc (FIG. 2) |
| <Shoulder lateral groove> | | | | |
| Angle α <degrees> | 84-90 | 84-90 | 84-90 | 84-90 |
| Distance Ds <mm> | 3.8 | 3.8 | 3.8 | 3.8 |
| Groove depth H12a at the deepest part <mm> | 6.2 | 6.2 | 6.2 | 6.2 |
| Groove depth H12b at the ground-contact edge <mm> | 5.0 | 4.0 | 4.0 | 4.0 |
| Groove depth H12c at the inner end <mm> | 1.0 | 1.0 | 1.0 | 1.0 |
| First inclined portion | Present | Present | Present | Present |
| Length La(*1) | 40% | 25% | 50% | 40% |
| Fixed-depth portion | Present | Present | Present | Present |
| Shoulder thin grooves | Present | Present | Present | Absent |
| Groove width <mm> | 1.5 | 1.5 | 1.5 | 0 |
| Groove depth <mm> | 1.0 | 1.0 | 1.0 | 0.0 |
| Noise performance | 98 | 100 | 110 | 107 |
| Early wear performance | 160 | 120 | 125 | 125 |

*1 . . . Length La is indicated by a ratio La/L12 of the length La to the tire axial length L12 of the shoulder lateral groove.

As shown in the table, it can be confirmed that early wear performance of a shoulder portion of the examples has been improved without deteriorating the noise performance.

What is claimed is:

1. A pneumatic tire with a tire flattening rate of more than 55% and less than 70%, wherein
on a meridian cross section of a tire which is mounted on a standard wheel rim, and in a condition with an internal

TABLE 1-1

Figure 8:
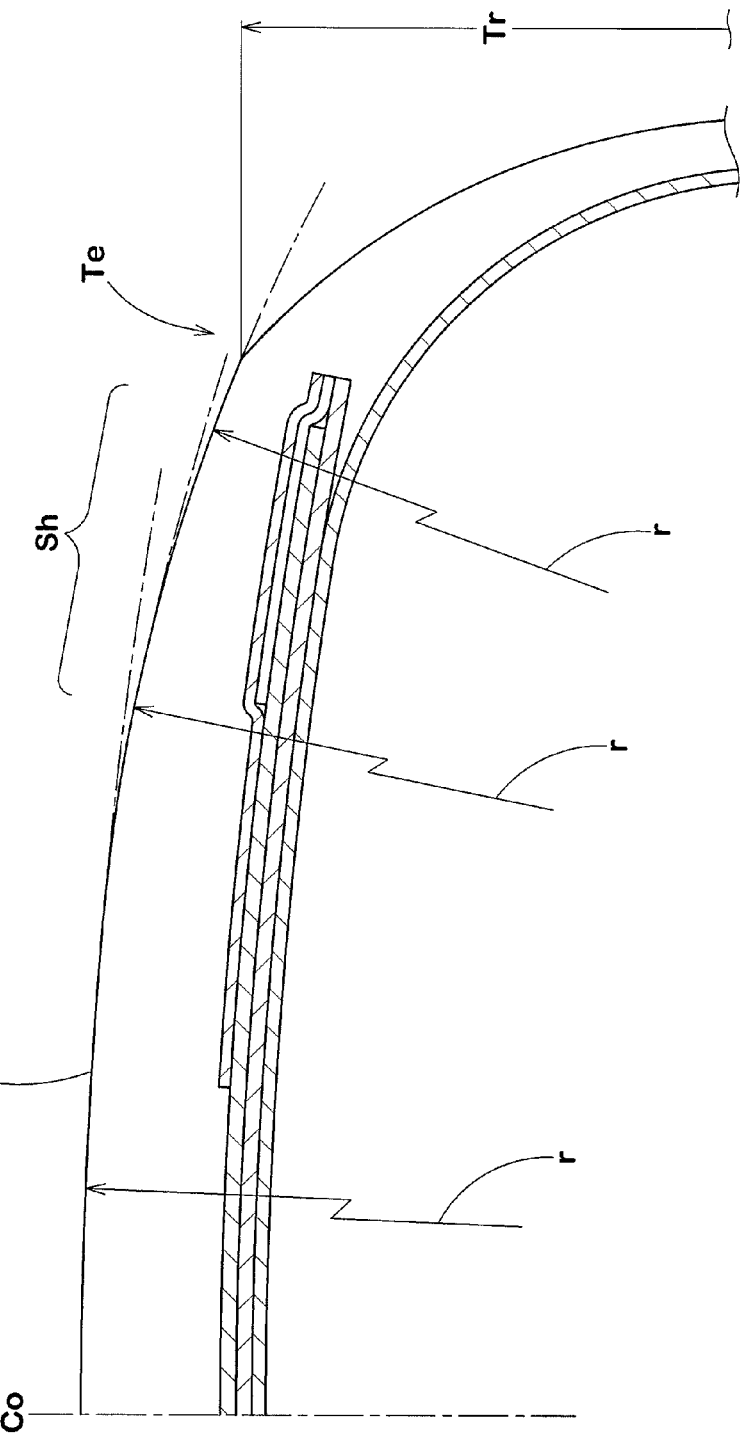
FIG. 8 is a cross sectional view showing one embodiment of tread contour shape of a conventional tire.

| | Comparative example 1 | Example 1 | Comparative example 2 | Example 2 | Example 3 | Comparative example 3 | Example 4 | Example 5 | Comparative example 4 | Example 6 | Example 7 |
|---|---|---|---|---|---|---|---|---|---|---|---|
| <Tread Contour Shape> | Composite arcs (FIG. 8) | Single arc (FIG. 2) | Single arc (FIG. 2) | Single arc (FIG. 2) | Single arc (FIG. 2) | Single arc (FIG. 2) | Single arc (FIG. 2) | Single arc (FIG. 2) | Single arc (FIG. 2) | Single arc (FIG. 2) | Single arc (FIG. 2) |
| <Shoulder lateral groove> | | | | | | | | | | | |
| Angle α <degrees> | 84-90 | 84-90 | 64-70 | 80-85 | 88-90 | 84-90 | 84-90 | 84-90 | 84-90 | 84-90 | 84-90 |
| Distance Ds <mm> | 3.8 | 3.8 | 3.8 | 3.8 | 3.8 | 0 | 3.5 | 5.5 | 7.0 | 3.8 | 3.8 |
| Groove depth H12a at the deepest part <mm> | 6.2 | 6.2 | 6.2 | 6.2 | 6.2 | 6.2 | 6.2 | 6.2 | 6.2 | 5.8 | 7.4 |
| Groove depth H12b at the ground-contact edge <mm> | 4.0 | 4.0 | 4.0 | 4.0 | 4.0 | 4.0 | 4.0 | 4.0 | 4.0 | 4.0 | 4.0 |
| Groove depth H12c at the inner end <mm> | 1.0 | 1.0 | 1.0 | 1.0 | 1.0 | 1.0 | 1.0 | 1.0 | 1.0 | 1.0 | 1.0 |
| First inclined portion | Present | Present | Present | Present | Present | Present | Present | Present | Present | Present | Present |
| Length La (*1) | 40% | 40% | 40% | 40% | 40% | 40% | 40% | 40% | 40% | 40% | 40% |
| Fixed-depth portion | Present | Present | Present | Present | Present | Present | Present | Present | Present | Present | Present |
| Shoulder thin grooves | Present | Present | Present | Present | Present | Present | Present | Present | Present | Present | Present |
| Groove width <mm> | 1.5 | 1.5 | 1.5 | 1.5 | 1.5 | 1.5 | 1.5 | 1.5 | 1.5 | 1.5 | 1.5 |
| Groove depth <mm> | 1.0 | 1.0 | 1.0 | 1.0 | 1.0 | 1.0 | 1.0 | 1.0 | 1.0 | 1.0 | 1.0 |
| Noise performance | 100 | 105 | 110 | 105 | 102 | 90 | 105 | 105 | 105 | 110 | 100 |
| Early wear performance | 100 | 130 | 98 | 110 | 120 | 90 | 125 | 130 | 125 | 110 | 150 |

(*1) Length La is indicated by a ratio La/L12 of the length La to the tire axial length L12 of the shoulder lateral groove.

pressure of 5%, which is 5% of standard internal pressure, a contour line of a surface of a tread portion forms an arc having a single radius of curvature, the tread portion comprising circumferential main grooves including shoulder circumferential main grooves which continuously extend in a tire circumferential direction and are arranged at the axial outermost side of the tire, and crown circumferential main grooves arranged on the tire axial inner side of the shoulder circumferential main grooves and on both sides of a tire equator, shoulder land portions disposed on the tire axial outer side of the shoulder circumferential main grooves and middle land portions arranged between the crown circumferential main grooves and the shoulder circumferential main grooves, each of the shoulder land portions is provided with a plurality of shoulder lateral grooves extending from the tire axial outer side of a tread ground-contact edge to a tire axial inner side and an inner end of the shoulder lateral grooves terminating within the shoulder land portions, the shoulder lateral grooves have an angle α with respect to the tire circumferential direction in a range of 80 to 90° and a tire axial distance Ds between the tire axially inner end and the shoulder circumferential main groove is in a range of 3.5 to 5.5 mm, the shoulder lateral grooves have the deepest part where the groove depth is largest and the groove depth of the deepest part is made 70 to 90% of the groove depth of the shoulder circumferential main groove, each of the middle land portions is provided with a plurality of middle inclined grooves extending at an angle β of 0 to 45° with respect to the circumferential direction, extending axially inward from the shoulder circumferential main groove, and an inner end of the middle inclined grooves terminate within the middle land portions, each of the middle inclined groove includes a linear groove section which linearly extends axially inward at an angle β1 of 20° or less with respect to the tire circumferential direction, and a connecting groove portion which extends from the linear groove portion to the shoulder circumferential main groove while arcuately bending and/or polygonally curving, such that the angle β sequentially increases, axially outwardly.

2. The pneumatic tire according to claim 1, wherein the shoulder land portions comprise shoulder thin grooves extending in the tire circumferential direction through the tire axially inner ends of the shoulder lateral grooves, the width of the shoulder thin grooves being narrower than the shoulder main grooves, and the groove depth of said shoulder thin grooves is identical to the groove depth of the shoulder lateral grooves at the tire axially inner end.

3. The pneumatic tire according to claim 1 or 2 wherein a ratio TW1/TW0 of a ground-contact width TW1, which is a width in the tire axial direction between the tread ground-contact edges, to a tire sectional width TW0 is 0.73 to 0.79.

4. The pneumatic tire according to claim 1 wherein the shoulder lateral grooves comprise a first inclined portion whose groove depth gradually increases from the tire axially inner end to the axially outer side of the tire, and a fixed-depth portion which connects to the first inclined portion and whose groove depth is fixed, and wherein the tire axial length of the first inclined portion is 25 to 50% of the tire axial length from the tire axially inner end of the shoulder lateral grooves to a tread ground-contact edge.

5. The pneumatic tire according to claim 4 wherein the shoulder lateral grooves are deepest in the fixed-depth portion.

6. The pneumatic tire according to claim 1 wherein the shoulder lateral grooves have a groove depth at the tread ground-contact edge of 4.0 to 5.0 mm.

7. The pneumatic tire according to claim 1 wherein the shoulder land portions comprise an arcuate chamfered section at a corner portion where a tread surface and a groove wall surface of the shoulder circumferential main groove meet.

8. The pneumatic tire of claim 1, wherein the tread contour line has a radius of curvature of 3.0 to 4.5 times the ground contact width of the tire.

9. The pneumatic tire of claim 1, wherein the shoulder lateral grooves open at the outer side of the tread ground-contact edge.

10. The pneumatic tire of claim 1, wherein the middle inclined grooves terminate at a distance spaced apart from the crown circumferential main grooves.

11. The pneumatic tire of claim 10, wherein the spaced-apart distance is 1.5 to 3.5 mm.

12. The pneumatic tire of claim 1 wherein the connecting groove portion of the angle β at an intersection with the shoulder circumferential main groove is 35 to 45°.

* * * * *